US012216454B2

(12) United States Patent
Drews et al.

(10) Patent No.: US 12,216,454 B2
(45) Date of Patent: Feb. 4, 2025

(54) EXTENSION DEVICE FOR AN AUTOMATION DEVICE

(71) Applicant: SIEMENS AKTIENGESELLSCHAFT, Munich (DE)

(72) Inventors: Norman Drews, Chemnitz (DE); Johannes Frank, Munich (DE); Andreas Macher, Neumarkt (DE); Josep Soler Garrido, Munich (DE); Ingo Thon, Grasbrunn (DE); Renè Fischer, Limbach-Oberfrohna (DE); Heiko Claussen, Wayland, MA (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/296,250

(22) PCT Filed: Oct. 28, 2019

(86) PCT No.: PCT/EP2019/079381
§ 371 (c)(1),
(2) Date: May 23, 2021

(87) PCT Pub. No.: WO2020/104141
PCT Pub. Date: May 28, 2020

(65) Prior Publication Data
US 2022/0019200 A1    Jan. 20, 2022

(30) Foreign Application Priority Data
Nov. 23, 2018  (EP) .................................. 18208144

(51) Int. Cl.
*G05B 19/418*    (2006.01)

(52) U.S. Cl.
CPC ............. *G05B 19/41835* (2013.01); *G05B 2219/25255* (2013.01); *G05B 2219/31229* (2013.01)

(58) Field of Classification Search
CPC .... G05B 19/41835; G05B 2219/25255; G05B 2219/31229; G05B 19/0421; G05B 19/05
See application file for complete search history.

(56) References Cited

U.S. PATENT DOCUMENTS 4,908,746 A * 3/1990 Vaughn ................ G05B 19/058
700/18
6,779,048 B2   8/2004 Seki et al.
(Continued)

FOREIGN PATENT DOCUMENTS

CN    101819426 A    9/2010
CN    101971176 A    2/2011
(Continued)

OTHER PUBLICATIONS

European Search Report for European Application No. 18208144.8-1205 dated May 24, 2019.
(Continued)

*Primary Examiner* — Kenneth M Lo
*Assistant Examiner* — Mohammed Shafayet
(74) *Attorney, Agent, or Firm* — Lempia Summerfield Katz LLC

(57) ABSTRACT

An extension device for one or more automation devices in an industrial system is provided. Industrial data processing units capable of performing data processing based on one or more artificial neural networks are provided. To enable and/or accelerate one or more computations in an industrial system, thereby simplifying integration of artificial intelligence into the industrial system, and to simplify data exchange between an extension device capable of process- (Continued)

ing data using artificial intelligence and an automation device, one or more results of the one or more computations are obtained. The results indicate one or more states of the industrial system. The one or more results are provided via a process state model shared with the automation device to monitor and/or control the industrial system.

18 Claims, 3 Drawing Sheets

(56) References Cited

U.S. PATENT DOCUMENTS

| | | | |
|---|---|---|---|
| 2001/0034830 A1* | 10/2001 | Seki | G05B 19/0426 |
| | | | 710/10 |
| 2003/0078680 A1* | 4/2003 | Edwards | G05B 15/02 |
| | | | 700/174 |
| 2009/0312999 A1 | 12/2009 | Kasztenny et al. | |
| 2010/0146167 A1 | 6/2010 | Rasche et al. | |
| 2010/0299356 A1 | 11/2010 | Sedlar | |
| 2014/0336786 A1* | 11/2014 | Asenjo | G06F 3/048 |
| | | | 700/17 |
| 2014/0336795 A1* | 11/2014 | Asenjo | G05B 19/4083 |
| | | | 700/86 |
| 2014/0337429 A1* | 11/2014 | Asenjo | G06Q 10/0637 |
| | | | 709/204 |
| 2017/0357249 A1* | 12/2017 | Sandler | G06Q 10/00 |
| 2019/0011895 A1 | 1/2019 | Butler | |
| 2019/0079506 A1 | 3/2019 | Hubauer | |
| 2019/0081476 A1* | 3/2019 | Konya | H02J 3/00 |
| 2021/0406648 A1* | 12/2021 | Lathrop | G06N 3/08 |

FOREIGN PATENT DOCUMENTS

| | | |
|---|---|---|
| CN | 102692897 A | 9/2012 |
| CN | 107491044 A | 12/2017 |
| CN | 108700873 A | 10/2018 |
| DE | 202004005842 U1 | 8/2004 |
| EP | 0381599 A2 | 8/1990 |
| EP | 3255589 A1 | 12/2017 |
| JP | 2018174137 A | 11/2018 |
| JP | 2020046873 A | 3/2020 |
| KR | 20110020830 A | 3/2011 |
| RU | 2439645 C2 | 1/2012 |

OTHER PUBLICATIONS

Hanssen Thijs: "Neurale Processor Unit", www.linkedin.com, XP055587880, Retrieved : URL:https://www.linkedin.com/pulse/neurale -processor-unit-thijs-hanssen/ Nov. 2018. pp. 1-2.
International Preliminary Report on Patentability for International Patent Application PCT/EP2019/079381 mailed Mar. 10, 2021.
PCT International Search Report and Written Opinion of International Searching Authority mailed Jan. 23, 2020 corresponding to PCT International Application No. PCT/EP2019/079381.

* cited by examiner

EXTENSION DEVICE FOR AN AUTOMATION DEVICE

This application is the National Stage of International Application No. PCT/EP2019/079381, filed Oct. 28, 2019, which claims the benefit of European Patent Application No. EP 18208144.8, filed Nov. 23, 2018. The entire contents of these documents are hereby incorporated herein by reference.

BACKGROUND

The present embodiments relate to an extension device for one or more automation devices in an industrial system. More specifically, the present embodiments relate to industrial data processing units capable of performing data processing based on one or more artificial neural networks. The present embodiments further relate to a system, an automation device, and a method.

With artificial intelligence (AI)-technology (e.g., machine intelligence) becoming more reliable and applications in industrial systems becoming more common, there is a demand for industrial AI equipment. Regular automation devices, such as programmable logic controllers (e.g., a PLC) do not have the computing power necessary for AI technology. Cloud-based AI solutions are available but are not easy to implement for shop floor solutions (e.g., results of a cloud-based AI solution may not be readily available on the shop floor).

SUMMARY AND DESCRIPTION

The scope of the present invention is defined solely by the appended claims and is not affected to any degree by the statements within this summary.

The present embodiments may obviate one or more of the drawbacks or limitations in the related art. For example, one or more computations of/in an industrial system are enabled and/or accelerated, thereby simplifying the integration of artificial intelligence into the industrial system. As another example, data exchange between an extension device capable of processing data using artificial intelligence and an automation device is simplified. Computations can include calculations.

An extension device operative to obtain one or more results of the one or more computations indicative of one or more states of the automation system is provided. The extension device is further operative to provide the one or more results via a process state model shared with the automation device to monitor and/or control the industrial system. Controlling includes but is not limited to actual open or closed loop control, changing set values, limit values, stopping, starting, pausing, or updating an industrial process.

The extension device may be a physical module that may be mounted (e.g., on a profile rail, next to an automation device, such as a PLC). The extension device may also be built as a plug-in module for existing automation devices. Integrating the extension device into an automation device is also possible, for example, with plug-in solutions and/or direct hardware integration.

The computations are, for example, computations and/or computations of neural networks (e.g., artificial neural networks (ANN)).

The results may be any result of the computations of the application, where the computations are carried out on data directly or indirectly originating in the industrial system. The results include but are not limited to classification of events that happened or are about to happen in the industrial system. For example, such events may be an unusual pattern showing in the data of, for example, sensors and actors used in a production line or a process automation line. Quality indicators indicating products produced having unusual patterns may also be computed. Unusual patterns may indicate a failure or low quality before the actual event occurs.

Industrial systems may be, for example, process industry systems, automation industry systems, building automation systems, and the like to be used in a professional industrial environment.

One or more states of the industrial system may be one or more general indicators of the system as a whole, one or more indicators of single entities such as automation controllers, I/O devices, sensors, actors, and the like, or states of one or more groups of entities. A state may be a value or other parameter based on at least one of the following: one or more sensed data, one or more predicted data, or one or more computed data. The data may thereby be indicative of the state of the described entity. For example, a motor is an actor that includes one or more of the following states: rotational speed, torque, temperature, current, voltage, health status, running hours, maintenance indicators, etc. Each of those states having the possibility of being divided into sub-states (e.g., the temperature may be a rotor temperature, a stator temperature, or a median overall motor temperature). The states may also be states of a product produced in the industrial system (e.g., a quality indicator). In a possible embodiment, one or more of the states may be binary (e.g., 1 for where the product qualifies as fulfilling all quality requirements; and 0 for where the product does not qualify for further processing and therefore has to be disposed or repaired).

The process state model generally is a data structure shared between the automation device and the extension device, enabling the automation device to directly use the results provided by the extension device. The process state model may include actual representation of one or more (e.g., all) current states used by the automation device to control and/or monitor the industrial system. In an exemplary implementation, the process state model represents a binary representation of input and output devices. A form of a process state model is known as process image commonly used and known in PLCs. The process state model serves as an intermediate storage for the states that are required to control and/or monitor the industrial system. This has the advantage that the inputs and/or outputs do not have to be read in from or written into the registers when executing a certain function in the program.

The present embodiments show that communicating via a process state model is advantageous for exchanging data between the extension device (e.g., a neural processing unit) and the automation device. This includes but is not limited to returning the one or more results of the one or more computations from the extension device via the process state model to the automation device. The automation device may access the results exchanged via the process state model directly and does not have to access a different API for communicating with the extension device. The engineering of such a communication is thereby simplified and focused on the processes and needed in any way for including any other module. The engineering therefore does not have to create a separate custom interface.

The process state model as a whole or parts of the process state model may be updated periodically triggered by events like interrupts or may be updated partly periodically and partly event-triggered.

Regarding security and/or safety measures, the process state model may be only partially shared with the extension device, where the extension device only has access to data relevant for computations by the extension device and also has access to a part of the process state model where the extension device may place results. Results may be provided as states directly or in raw form for further processing by the automation device. For transmitting large portions of data, the process state model may have a "transmission ready" indicator. A side channel may be used to transmit larger portions of data (e.g., via data records).

In a further embodiment, the extension device is a neural processing unit. The neural processing unit may be configured to compute one or more artificial neural networks. This enables the use of AI algorithms directly in industrial systems and facilitates the use of AI in industrial environments.

In a further embodiment, the extension device is operative to obtain the one or more results by applying logic to an intermediate result of the computations. Actual data from real industrial plants in some cases may and/or should be segmented into multiple classes by applying logic. A segmentation may be, for example, achieved by applying "if—then" structures or other more complicated segmentation techniques. The logic may be applied to the raw data before the raw data is provided for the computations. Computations may be performed directly on the raw data and afterwards be fed to the logic and further be fed to a further computation. Also, the computations may be done first, and the logic may be done as a subsequent step, before providing the results to the automation device.

In a further embodiment and to provide the results in a convenient way, the extension device is operative to update at least parts of the process state model with one or more of the results. The automation device may use and further process these results without any further delays. Updating the process state model may be implemented by writing variables into the applicable portions of the process state model, overwriting older existing results and/or creating a new part in the process state model to be exchanged between the extension device in the automation device. To avoid unnecessary data being transmitted via the communication interface between the automation device and the extension device, the parts of the process state model that should be updated by the extension device and the automation device, respectively, may be defined.

In a further embodiment, the extension device includes a processor operative to perform the one or more computations to provide the result. In one embodiment, the processor is adapted to compute neural networks in an efficient manner (e.g., with parallel processing capabilities). The processor may include one or more processing units, one or more control units, one or more volatile and non-volatile memories, and/or one or more peripheral interfaces.

In a further embodiment, the extension device includes a processing unit configured to perform one or more of the computations. The processing unit is adapted to perform the computations (e.g., with, compared to the automation devices, a higher efficiency and/or a higher speed). The processing unit may include a neural network accelerating architecture. These may be specific sub-processors that are specialized on computing convolutions, matrix multiplications, and the like. The processing unit may include multiple different or identical of those sub-processors.

In a further embodiment, the extension device includes a processing unit adapted to perform at least part of the computations with a SIMD-architecture. SIMD-architecture stands for single instruction, multiple data and describes computers with multiple processing elements that perform the same operation on multiple data points simultaneously. Modern processing units specialized for AI purposes have multiple processing cores that are specialized for SIMD-based computations. The processing unit may also communicate with a separate control unit that is adapted to run a program to control the SIMD architecture of the processing unit. The processing unit may be part of a processor.

In another embodiment, the extension device includes a processing unit based on a neural network accelerating architecture. For this purpose, the processing unit may include a neural network accelerating architecture. This architecture may be specific sub-processors/sub-processing units that are specialized on computing convolutions, matrix multiplications, and the like. The processing unit may include multiple different or identical of those sub-processors. The architecture may be part of an integrated processor and/or a SoC.

In a further embodiment, the extension device includes a processing unit configured to provide computations with 0, 1 or more TOPS/Watt. TOPS/Watt describes a measure for processing efficiency per energy consumed and is a known parameter describing processing power of AI units (—e.g., neural processing units (NPUs)), Tensor Processing Units, and the like. TOPS/Watt stands for tera-operations (e.g., $10^{12}$ or 10^12 operations) per second per Watt of energy consumed. The processor may provide 0, 1, 0, 5, 1, or 2, or more TOPS/Watt. While unlimited processing power is not available, a person skilled in the art will select a processing unit or a processor with one or more processing units most suitable for the invention as described in this application. The above values describe processors/processing units currently available (e.g., Intel Movidius Myriad X or Google's Cloud TPUs) which may be obsolete as a matter of time. Therefore, in the future, the person skilled in the art may select future state of the art processing units/processors without leaving the scope of the present embodiments. The use of highly energy efficient processing units has the great advantage of reducing the need for active power dissipation and reducing overall power consumption.

One or more of the features of the above embodiments of processing units may be combined in a single processor and/or processing unit.

In a further embodiment, the extension device includes a processing unit configured to provide computations with a processing speed of at least 10 GFLOPS (e.g., 20, 50 or 100 or more GFLOPS) of floating point operations per second.

In a further embodiment, the extension device is operative to obtain industrial data via the process state model. The industrial data may be obtained from the industrial system in an active or passive manner. An active obtaining of the industrial data may be requesting the data directly from the automation device and/or data for the devices connected to the automation device. Passively obtaining the data may be reading the data provided by the automation device via the process state model.

In a further embodiment, the extension device includes a control unit configured to retrieve and/or provide data from the automation device via the process state model. In this embodiment, the control unit is a unit that controls the communication via the process state model. This has the advantage that the actual processing unit is relieved of the communication and management overhead and may focus on the actual computations of the results. The control unit may be programmable and may provide an operating system for the extension device. The control unit may be configured to control the computations. The control unit may execute an application to control the processing unit to perform the computations. The control unit may implement the orchestration between and configuration of sub systems of the extension device. This includes but is not limited to configuring the extension device itself, routing data from the process state model to the applications running in a data processing component. This may also include starting, stopping, and loading applications, as well as implementing communication protocols between the automation device and the extension device. The control unit may also directly interact with peripheral devices (e.g., send a "take picture" command to a connected camera).

In a further embodiment, the extension device includes a communication interface operative to exchange at least parts of the process state model between the automation device and the extension device. In one embodiment, the communication interface is configured as a backplane interface for direct communication between the automation device and the extension device. The communication via the process state model may also be applied to other communication technologies such as PROFINET and other industrial communication standards. An access control mechanism may be applied to control the access to the common resource (e.g., the process state model). One example for a commonly known access control mechanism is the use of semaphores or similar mechanisms on a hardware basis.

In a further embodiment, the process state model includes state representations of in- and/or outputs of the automation device. A state representation of a binary input may be, for example, a "1" for a logical high or a "0" for a logical low. If the input, for example, is a DAC with 8 bit resolution, the state representation may be any value ranging from 0 to 255. Those examples show the basic principle of the state representations that also may include far more complex data. An implementation using a process state model has the advantage that the automation device does not have to read in inputs in every cycle or to write out the input in every cycle so that the hardware based I/O handling is separated from the actual application. This simplifies programming the automation device and the extension device working together as a system. As a great advantage of the current embodiment and the extension device communicating via the process state model is that the results may be treated like inputs and/or outputs of the automation device and may be processed equally simple and fast. The part of the process state model shared between the automation device and the extension device may also include any of the state representations of the inputs and/or outputs.

In a further embodiment, the extension device includes a peripheral connectivity system operative to provide connectivity to data sources. The data sources may be directly connected to the extension device. In this embodiment, the extension device provides the ability for direct connection to peripheral device, such as cameras, sensors, and/or further data sources. This is of high advantage when high data rate equipment is used. For example, computer vision for quality assurance in industrial appliances with high-speed cameras produces large amounts of data that usually have to be processed at an adequate speed to be of use in the industrial system. With the extension device providing a specialized processing unit and the peripheral connectivity system that may directly connect to such high-speed and/or high-bandwidth data sources, the actual automation device does not have to be stressed with unnecessary data loads from those data sources. The peripheral connectivity system may be provided as but is not limited to USB 3.0 or 3.1 interfaces. Further interfaces such as Ethernet (e.g., GigE Vision) or optical fiber connections are possible.

The present embodiments also include an engineering system operative to configure an extension device. An engineering system is a system to program and/or configure automation devices and also extension devices. The engineering system further provides the possibility to design whole industrial systems. A well known engineering system is the SIEMENS Totally Integrated Automation Portal (TIA Portal).

The present embodiments also include a system including one or more automation devices and one or more extension devices according to the present embodiments. At least one of the automation devices is operative to monitor and/or control an industrial system according to one or more results of one or more computations performed by the one or more of the extension devices. The one or more results are provided to the controller via a process state model.

The problem is also solved by an automation device operative to control an industrial system based on one or more results of one or more computations performed by one or more extension devices according to the present embodiments. The one or more results are provided to the controller via a process state model.

The present embodiments further include a method for providing results of a computation in an industrial system. The acts include obtaining one or more results of the one or more computations and providing the one or more results via a process state model. The act of obtaining may be performed by an extension device according to the present embodiments. The results indicate one or more states of the industrial system and may be shared with an automation device to monitor and/or control the industrial system.

The aspects and embodiments defined above and further aspects and embodiments of the present embodiments are shown in the examples to be described hereinafter and are explained with reference to the drawings, but to which the invention is not limited.

DETAILED DESCRIPTION

Figure 1:
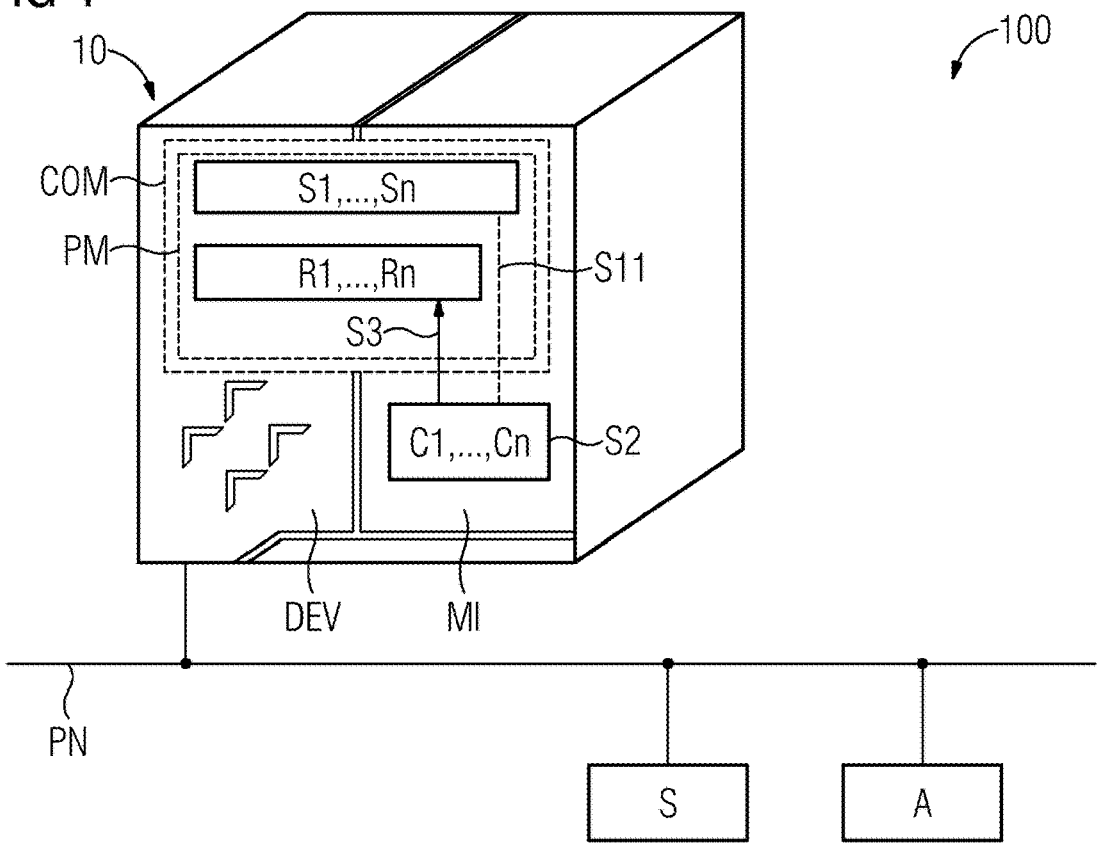
FIG. 1 is one embodiment of an automation device with an extension device in an industrial system.

FIG. 1 shows a system 10 including an automation device DEV with an attached extension device MI within an industrial system 100. The automation device DEV may be, for example, a PLC. The extension device MI and the automation device DEV may be mounted on a rail based mounting system (e.g., directly next to each other or at least on the same backplane communication). Plug-in solutions for the extension device MI to be plugged into the automation device DEV are possible but not shown. Industrial ruggedization is of advantage for the extension device MI. The industrial system 100 further includes a sensor S and an actor A that only exemplary stand for further components in the industrial system 100. The industrial system 100 in most use cases will have a much higher complexity as shown. The sensor S and the actor A are connected to the automation device DEV via an industrial bus PN, which, for example, is an industrial bus system such as PROFINET, PROFIBUS, and the like and may be connected to further I/O modules, sensors, actors, HMI devices, . . . .

The automation device DEV and the extension device MI are connected via a communication link COM, which is indicated by the dashed lines expanding over both devices MI, DEV. The communication link COM enables sharing a process state model PM between the two devices DEV, MI. The communication link COM may be a backplane communication provided by backplane communication ASICs in each of the devices DEV, MI. Such ASICs are commonly known from industrial application.

The process state model PM shows states S1, . . . , Sn that may indicate any state of the industrial system. This includes but is not limited to: states S1, . . . , Sn of I/Os of the automation device DEV or the device DEV itself, states S1, . . . , Sn of devices of the industrial system 100, states S1, . . . , Sn of goods produced in the industrial system 100, states S1, . . . , Sn of quality assurance of goods, states S1, . . . , Sn of health statuses of equipment used in the industrial system, such as machines and tools. The states S1, . . . , Sn may be used by the automation device to control and/or monitor the industrial system 100. The results R1, . . . , Rn may be obtained by computing one or more artificial neural networks.

In an example, the sensor S and the actor A may each provide states S1, . . . , Sn indicative of their own state (e.g., on, off, temperature, . . . ). The states S1, . . . , Sn may be provided to the automation device DEV and/or be polled or determined by the automation device DEV itself.

The extension device MI provides the possibility to obtain S2 one or more results R1, . . . , Rn of one or more computations C1, . . . , Cn. The extension device MI further provides S3 the one or more results R1, . . . , Rn via the process state model PM. In a further embodiment, the extension device MI may directly update certain states S1, . . . , Sn with the results R1, . . . , Rn. Optionally, a dashed line that indicates the act of obtaining S11 states S1, . . . , Sn for performing the computations C1, . . . , Cn based on at least one of the states S1, . . . , Sn is shown.

The communication link COM may support access control mechanisms to control the access to the process state model PM to avoid data mismatch (e.g., a state S1 having a different value within the process state model PM currently available in the automation device DEV compared to the process state model PM currently available in the extension device MI). One example for such an access control mechanism to a common resource is the use of semaphores.

In an example, the actor A may be a motor, and the sensor S may be a temperature sensor connected to the outside of the motor. The automation device DEV may then read in the sensor value as a temperature state and provide the read in sensor value to the extension device MI via the process state model PM. A trained neural network in the extension device MI may then provide a result R1, . . . , Rn indicative of a predicted state S1, . . . , Sn. In this example, those results may be a health status of the motor, a temperature at a different position in the motor, and/or a load indicator of the motor. The results R1, . . . , Rn may be computed by an artificial neural network or the like in the extension device MI.

Figure 2:
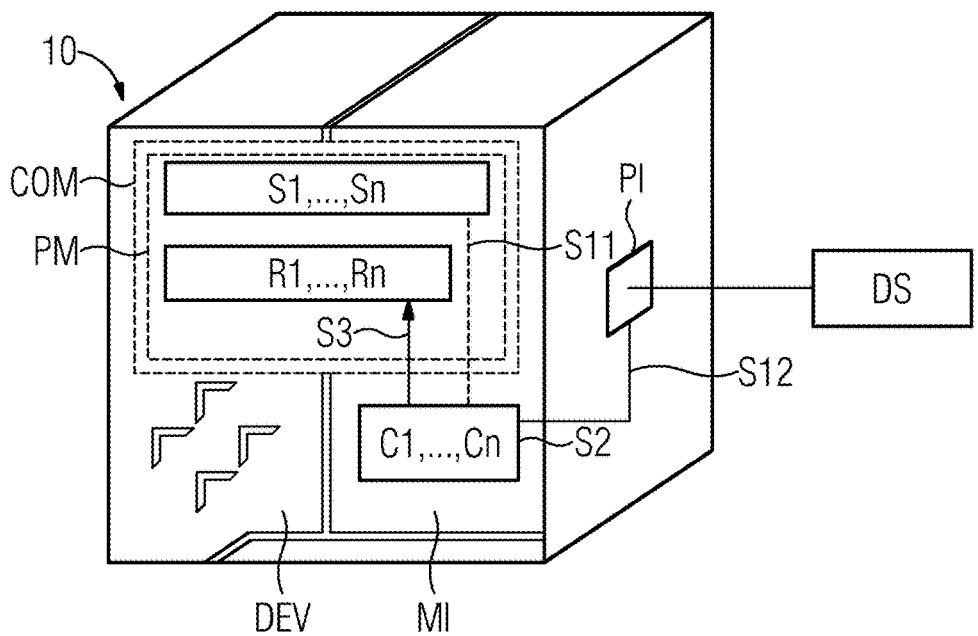
FIG. 2 is one embodiment of an automation device with an extension device and a data source.

FIG. 2 shows a system 10 similar to the system of FIG. 1 while using the same reference signs when referencing to the same elements. The extension device MI is, as schematically indicated, directly connected to a data source DS via a peripheral interface PI. The act of obtaining S12 data from the data source DS to perform computations C1, . . . , Cn based at least in part on data from the data source DS may be performed by the extension device MI. The peripheral interface PI is also connected to the computations C1, . . . , Cn, indicating that data of the data source DS may be fed (e.g., directly without preprocessing or indirectly while applying some form of preprocessing) into computations C1, . . . , Cn. A dashed line S11 from the states S1, . . . , Sn provided via the process state model PM to the computations C1, . . . , Cn indicates that states S1, . . . , Sn may be directly or indirectly used in the computations C1, . . . , Cn. This was also shown in FIG. 1. The states S1, . . . , Sn may also be used to trigger the execution of one or more computations C1, . . . , Cn or to switch between different computations C1, . . . , Cn (e.g., different pre-trained neural networks) available in the extension device MI.

One advantage of the present embodiments is that the embodiments of FIG. 1 and FIG. 2 are combinable in any way. For example, sensors S and actors A connected via an industrial bus PN may be used for or in computations C1, . . . , Cn based on data from a high speed data source DS. This provides a level of flexibility often needed for industrial applications.

Figure 3:
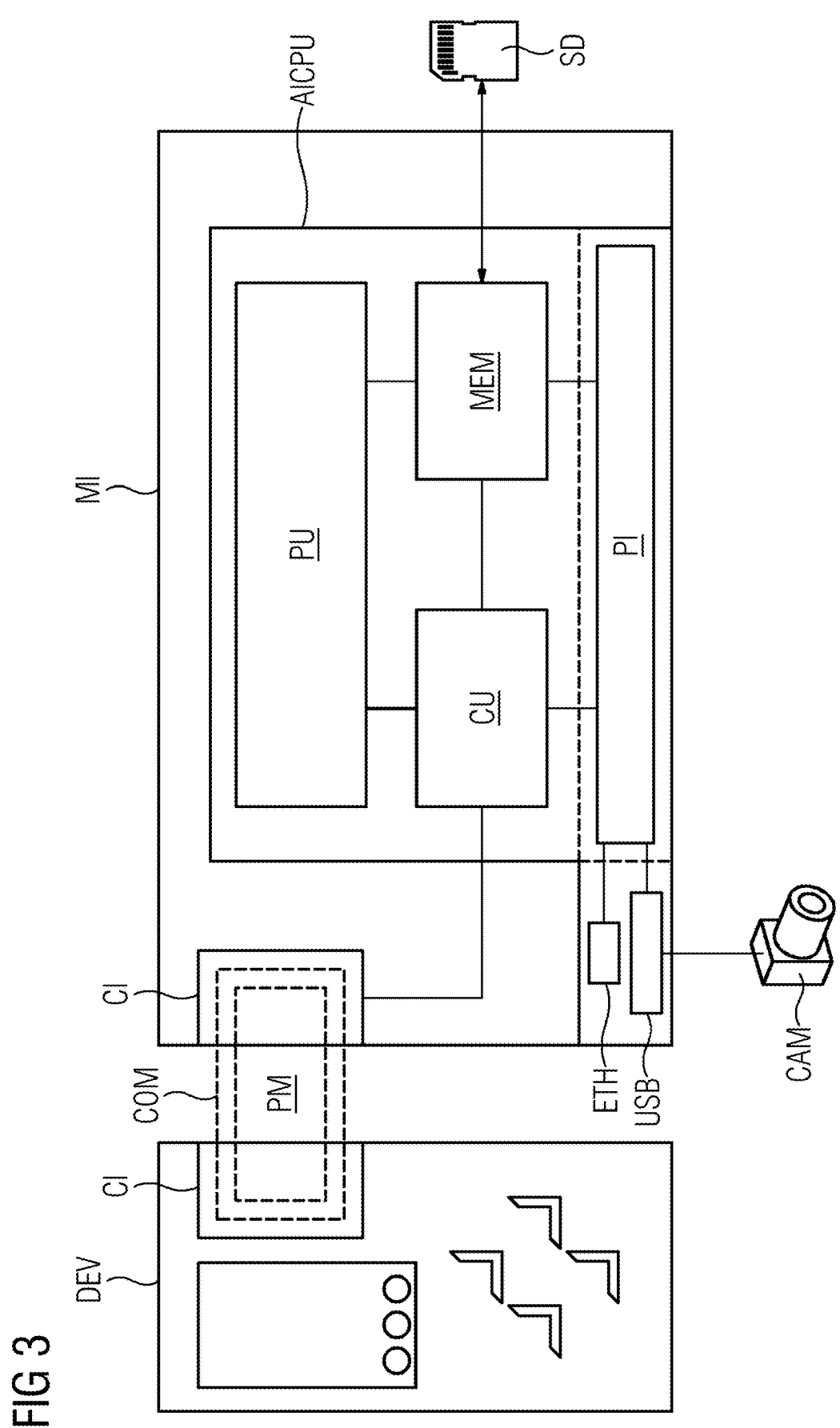
FIG. 3 is one embodiment of an automation device with a more detailed extension device.

FIG. 3 shows a more detailed view of a system including an automation device DEV and an extension device MI. The automation device DEV includes a communication interface CI that connects to a communication interface CI of the extension device MI via a communication link COM. As known from FIG. 1 and FIG. 2, the communication link COM enables a process state model PM to be shared between the extension device MI and the automation device DEV.

The extension device MI includes a processor AICPU that includes further sub units and interfaces. A control unit CU connects to the communication interface CI and serves as a management unit, managing the connection to the automation device DEV and further providing data received via the process state model PM. The control unit CU may also provide an execution environment for executing applications. Applications executed on the extension device MI implement the functionality that the computations and the results provide. The applications may be executed on both, the control unit CU and the processing unit PU, where the actual computations C1, . . . , Cn are executed on the processing unit PU. It is of advantage when the management part of the application is executed on the control unit and the actual computation part is executed on the processing unit PU.

The processing unit PU provides the actual hardware implementation for performing the computations in energy efficient and time optimized manner. A memory MEM may include a volatile high speed memory such as a RAM (preferably DDR-RAM) and a non-volatile memory such as, for example, an SD card SD as shown. Other non-volatile memory types are possible. The high speed memory may be used for directly providing the data for the computations to the processing unit. The non-volatile or persistent data storage may have further uses. Such uses may be but are not limited to: storing samples from the data run through the processing unit PU, storing the application that dynamically controls a flow of data and results via the control unit CU for the data processing (e.g., the computations C1, . . . , Cn), storing the data for the application (e.g., the trained neural network), and providing a storage for the stored data/applications to be copied/modified to and from the memory directly or via communication functions such as backplane bus, USB, or Ethernet.

The processing unit PU (e.g., a data processing subsystem) runs the application actually performing the computations. The processing unit PU typically provides specialized hardware for efficiently performing AI and neural computations, such as vector processors with SIMD capabilities, or dedicated hardware to implement matrix operations or convolutions, and other programmable processing units. The control unit CU may control the processing unit PU by running a part of the user application that controls the computations.

The control unit CU may provide access to a peripheral interface PI. In this embodiment, the peripheral interface PI includes two USB ports and an Ethernet port ETH. The peripheral interface PI may be configured to connect to any kind of device that may provide data that may be used for the computations to provide results. For example, wireless communication to multiple data sources DS is possible and may be useful for retrofit solutions (e.g., for already existing industrial plants).

As indicated by solid black connections between the processing unit PU, the control unit CU, and the memory MEM, each of the units or sub units may access the other part directly or via the control unit CU. In some embodiments, only parts of the units PU, CU, MEM may be accessible by the others. The general concept is that the control unit CU manages functions while running an application and controls the operation of the processing unit PU with the computations C1, . . . , Cn to be provided for the application. The processing unit PU has access to the memory MEM (e.g., a fast memory, such as a DDR-RAM) to process the data that the control unit CU provides.

A camera CAM is connected to the peripheral interface PI. The data from the camera CAM is provided to the control unit CU via the peripheral interface PI. The camera may be connected via Ethernet (e.g., GigE Vision), USB 3.0, 3.1, or following standards.

The processor AICPU may be configured as a single system on a chip (SOC) providing all the above units. The processor AICPU may also be built as a processing board including some of the sub units grouped onto single hardware chips and others provided as standalone processing hardware.

In a detailed example, a typical computation C1, . . . , Cn may be as follows, the single acts being in order of regular execution with the possibility to exchange, repeat, or skip acts.

1.) The automation device DEV (e.g., a PLC) continuously updates the process state model PM, reads inputs from the extension device MI, and writes outputs to the extension device MI. All this may be done in one cycle of the automation device.

2.) A trigger event on the automation device DEV may be the start of the execution of an organization block (e.g., which may be freely running or precisely timed, such as via periodic interrupts/triggers). Organization blocks are sometimes referred to as continuous tasks or periodic tasks, respectively.

3.) The automation device DEV triggers a command in the extension device MI. This may be performed by setting a flag in the process state model PM.

4.) Optionally and/or additionally, data records may be sent in parallel from the automation device DEV to the extension device MI. A data record is a form of a direct data transmission commonly used in automation devices.

5.) When the trigger is processed in the extension device MI, the control unit CU is calling a function in an application to be processed by the extension device MI.

a. Optionally, a collection of additional data from external data sources DS such as a camera CAM may be performed by using the peripheral interface PI. The extension device MI may provide an indicator via the process state model PM that an image has been captured and is now available for further processing (e.g., by the processing unit PU). The indicator may be a state $S1, \ldots, Sn$.

b. In a further act, the collected data is pre-processed in accordance to the data processing needs. This, for example, may be normalizing one or more images such that a constant level of contrast and/or brightness is achieved or a scaling of one or more images to a resolution suitable for further processing. Logic may be applied to data to eliminate data not needed or to select data for further pre-processing.

c. Afterwards, all data (e.g., states $S1, \ldots, Sn$ from automation device DEV, obtained via the process state model PM, values from data sources DS, actors A, and/or sensors S) is packed in a form like data processing application is expecting (e.g., a tensor/vectors to be processed by a neural network by the processing unit PU).

d. The next act is to execute one or more mathematical functions prescribed by the data processing part of the application by the processing unit PU.

e. In a post-processing act, one or more results of the one or more mathematical functions are aggregated and prepared to be returned to the automation device DEV.

f. After all functions have been applied, the one or more results $R1, \ldots, Rn$ are collected, and the control unit CU is notified.

6.) The control unit CU then provides the results of processing to the automation device DEV via the process state model PM.

7.) The one or more results are processed in the automation device DEV to monitor and/or control the industrial system. As the computation may take a number of cycles, the availability of a new result may be indicated by a status bit (e.g., a binary state) in the process state model PM.

Figure 4:
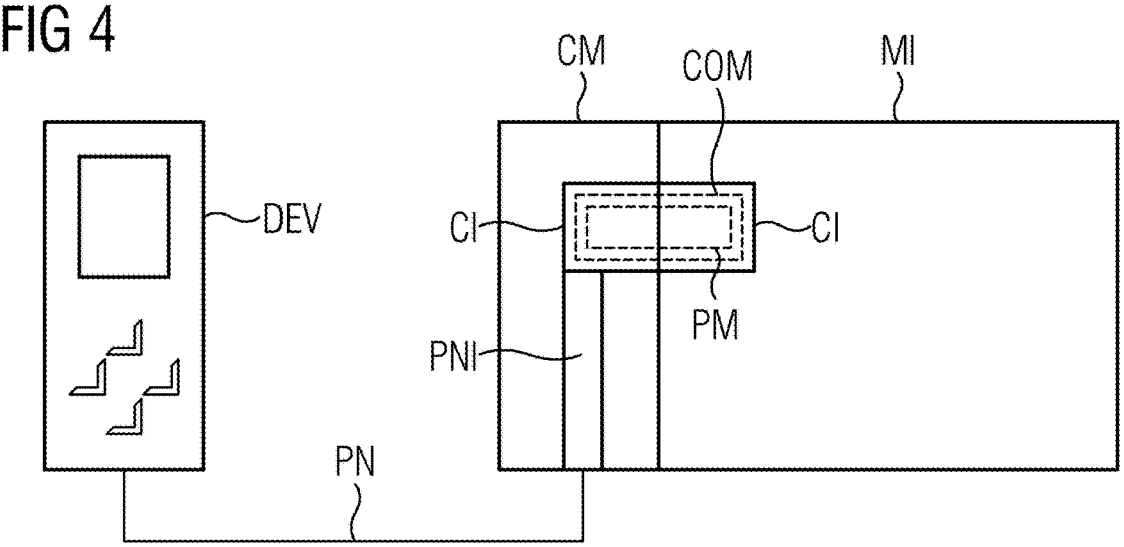
FIG. 4 is one embodiment of an extension device with a connection module.

FIG. 4 shows another embodiment of a system including an extension device MI connected with a connection module CM. The connection module CM provides connection to an industrial bus system PN via a bus-interface PNI. The industrial bus system PN provides connection to an automation device DEV. The connection module CM includes a communication interface CI connected to a communication interface CI of the extension device MI. The communication interfaces CI provide the communication link COM known from the previous embodiments. A process state model PM is extended from the automation device DEV to the extension device MI via the industrial bus system PN and the connection module CM. The connection module CM allows all embodiments from FIGS. 1, 2 and/or 3 to be applied to the embodiment shown in FIG. 4. In a further embodiment, the connection module CM may be a part (e.g., a plug in module) of the extension device MI.

Figure 5:
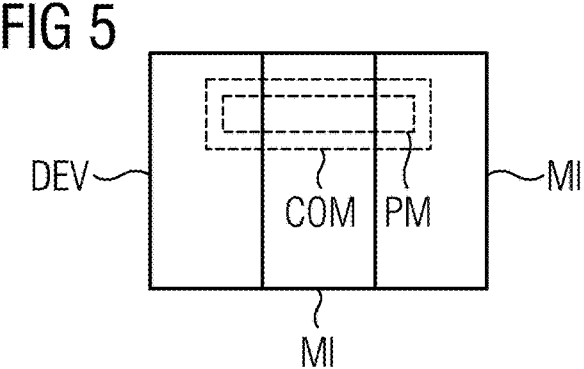
FIG. 5 is one embodiment of an automation device with multiple extension devices.

FIG. 5 shows a single automation device DEV with multiple extension devices MI. The process state model PM known from the previous embodiments expands over all devices DEV, MI. This may be of advantage when multiple neural networks for different purposes (e.g., one for a camera quality inspection and one for a general health status of the industrial system) have to be computed and/or more processing power is needed. Also, large neural networks may be distributed between the multiple extension devices MI. This shows the flexibility the communication via a process state model PM according to the current invention enables.

Figure 6:
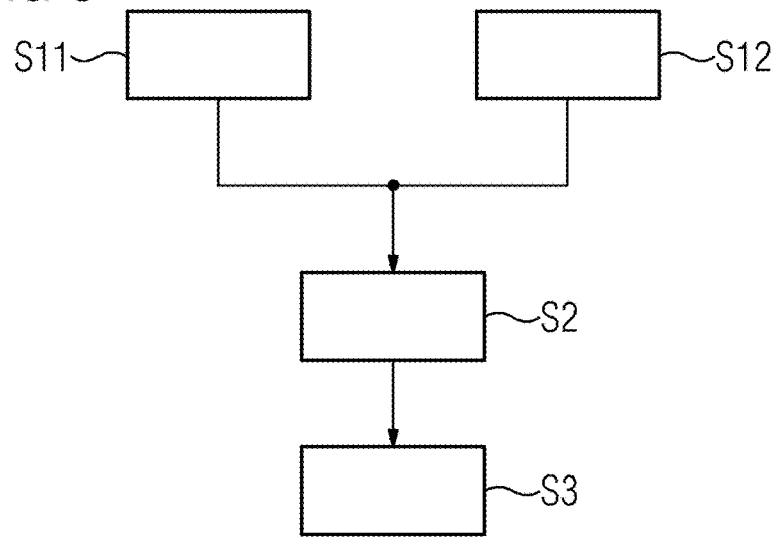
FIG. 6 is a flow chart of one embodiment of a method.

FIG. 6 shows a flow chart of an example for an embodiment of a method applicable to the extension device MI. The provided order may be followed or changed without leaving the scope of the present embodiments. Some acts S11, S12, S2, S3 may be skipped or executed more than once.

A first act includes obtaining S11 states S1, . . . , Sn for performing computations C1, . . . , Cn based on at least one of the states S1, . . . , Sn. A second act includes obtaining S12 data from the data source DS to perform computations C1, . . . , Cn. The computations C1, . . . , Cn are at least part based on the data from the data source DS and may be performed by the extension device MI. The acts of obtaining S11 and S12 are optional and may be carried out multiple times.

A third act includes obtaining S2, by an extension device MI, one or more results R1, . . . , Rn of the one or more computations C1, . . . , Cn are obtained. The results R1, . . . , Rn indicate one or more states S1, . . . , Sn of the industrial system 100.

A fourth act includes providing S3 the one or more results R1, . . . , Rn via a process state model PM shared with an automation device DEV to monitor and/or control the industrial system 100.

The present embodiments relate to an extension device MI for one or more automation devices DEV in an industrial system 100. The present embodiments particularly relate to industrial data processing units PU capable of performing data processing based on one or more artificial neural networks. To enable and/or accelerate one or more computations C1, . . . , Cn in an industrial system 100, thereby simplifying the integration of artificial intelligence into the industrial system 100, and to simplify data exchange between an extension device MI capable of processing data using artificial intelligence and an automation device DEV, the present embodiments include obtaining S2 one or more results R1, . . . , Rn of the one or more computations C1, . . . , Cn. The results R1, . . . , Rn indicate one or more states S1, . . . , Sn of the industrial system 100. The one or more results R1, . . . , Rn are provided S3 via a process state model PM shared with the automation device DEV to monitor and/or control the industrial system 100.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An extension device for an automation device in an industrial system, the extension device being operable to enable, accelerate, or enable and accelerate one or more computations, wherein the extension device is directly connected to a camera via a peripheral interface, the extension device comprising:
a processor configured to:
perform the one or more computations based at least in part on data collected from the camera by the extension device;
obtain one or more results of the one or more computations, wherein the one or more results indicate one or more states of the industrial system, wherein an availability of a new result of the one or more results is indicated by a status bit in a process state model shared between the extension device and the automation device; and
provide the one or more results via the process state model to monitor, control, or monitor and control the industrial system,
wherein the process state model is a data structure and comprises state representations of devices of the industrial system, the state representations being based on data indicative of one or more characteristics of the devices of the industrial system, and
wherein the extension device is operable to provide an indicator via the process state model that an image has been captured and is available for further processing.

2. The extension device of claim 1, wherein the extension device is a neural processing unit configured to compute one or more artificial neural networks.

3. The extension device of claim 1, wherein the processor is further configured to apply logic to an intermediate result of the one or more computations, to the one or more states, or to a combination thereof.

4. The extension device of claim 1, wherein the processor is further configured to update at least parts of the process state model with one or more of the results.

5. The extension device of claim 1, wherein the processor comprises a processing unit configured to perform the one or more computations.

6. The extension device of claim 1, wherein the processor comprises a processing unit configured to perform at least part of the one or more computations with a SIMD-architecture.

7. The extension device of claim 1, wherein the processor comprises a processing unit based on a neural network accelerating architecture.

8. The extension device of claim 1, wherein the processor comprises a processing unit configured to provide computations with 0,1 or more TOPS/Watt.

9. The extension device of claim 1, wherein the processor is operative to obtain industrial data via the process state model.

10. The extension device of claim 1, further comprising a control unit configured to retrieve, provide, or retrieve and provide data to or from the automation device via the process state model.

11. The extension device of claim 1, further comprising a communication interface operative to exchange at least parts of the process state model between the automation device and the extension device.

12. The extension device of claim 1, further comprising a peripheral connectivity system operative to provide connectivity to data sources connected to the extension device.

13. The extension device of claim 1, wherein the automation device is configured to trigger a command in the extension device by setting a flag in the process state model.

14. The extension device of claim 1, wherein the indicator is a state representation.

15. The extension device of claim 1, wherein the status bit is a binary state.

16. A system comprising:
one or more automation devices in an industrial system; and
one or more extension devices, each extension device of the one or more extension devices being operable to enable, accelerate, or enable and accelerate one or more computations, wherein the respective extension device is directly connected to a camera via a peripheral interface, the respective extension device comprising:
a processor configured to:
perform the one or more computations based at least in part on data collected from the camera by the respective extension device;
obtain one or more results of the one or more computations, wherein the one or more results indicate one or more states of the industrial system; and
provide the one or more results via a process state model shared between the respective extension device and a respective automation device of the one or more automation devices to monitor, control, or monitor and control the industrial system,
wherein the process state model is a data structure and comprises state representations of devices of the industrial system, the state representations being based on data indicative of one or more characteristics of the devices of the industrial system,
wherein at least one of the one or more automation devices is operative to monitor, control, or monitor and control the industrial system according to at least one result of at least one computation performed by the one or more extension devices,
wherein an availability of the at least one result is indicated by a status bit in the process state model,
wherein the at least one result is provided to the at least one automation device via the process state model, and
wherein the respective extension device is operable to provide an indicator via the process state model that an image has been captured and is available for further processing.

17. An automation device comprising:
a processor configured to control an industrial system based on one or more results of one or more computations performed by one or more extension devices, the one or more extension devices being operable to enable, accelerate, or enable and accelerate the one or more computations, wherein the one or more extension devices are directly connected to a camera via a peripheral interface, a processor of the one or more extension devices being configured to perform the one or more computations based at least in part on data collected from the camera by the one or more extension devices, obtain the one or more results of the one or more computations, wherein the one or more results indicate one or more states of the industrial system,
wherein the one or more results are provided to the automation device via a process state model shared between the one or more extension devices and the automation device,
wherein an availability of a new result of the one or more results is indicated by a status bit in the process state model,
wherein the process state model is a data structure and comprises state representations of devices of the industrial system, the state representations being based on data indicative of one or more characteristics of the devices of the industrial system, and
wherein the one or more extension devices are operable to provide an indicator via the process state model that an image has been captured and is available for further processing.

18. A method for providing results of a computation in an industrial system, the method comprising:
obtaining, by an extension device, one or more of the results of the computation, wherein the results indicate one or more states of the industrial system, wherein the extension device is directly connected to a camera via a peripheral interface;
wherein an availability of a new result of the one or more results is indicated by a status bit in a process state model shared between the extension device and the automation device; and
providing the results via the process state model to monitor, control, or monitor and control the industrial system,
wherein the process state model is a data structure and comprises state representations of devices of the industrial system, the state representations being based on data indicative of one or more characteristics of the devices of the industrial system, and
wherein the extension device is operable to provide an indicator via the process state model that an image has been captured and is available for further processing.

* * * * *